(12) United States Patent
Lu et al.

(10) Patent No.: US 11,051,346 B2
(45) Date of Patent: Jun. 29, 2021

(54) METHOD AND APPARATUS FOR RANDOM ACCESS

(71) Applicant: ZTE CORPORATION, Guangdong (CN)

(72) Inventors: Ting Lu, Guangdong (CN); Bo Dai, Guangdong (CN); Yuanfang Yu, Guangdong (CN); Wei Zou, Guangdong (CN); Qian Dai, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/937,133

(22) Filed: Jul. 23, 2020

(65) Prior Publication Data

US 2020/0367291 A1 Nov. 19, 2020

Related U.S. Application Data

(63) Continuation of application No. 16/068,853, filed as application No. PCT/CN2017/071105 on Jan. 13, 2017, now Pat. No. 10,736,149.

(30) Foreign Application Priority Data

| Jan. 13, 2016 | (CN) | 201610020739.8 |
| Feb. 5, 2016 | (CN) | 201610081474.2 |
| Apr. 29, 2016 | (CN) | 201610286416.3 |

(51) Int. Cl.
*H04W 74/08* (2009.01)
*H04W 74/00* (2009.01)

(52) U.S. Cl.
CPC ... *H04W 74/0833* (2013.01); *H04W 74/0866* (2013.01); *H04W 74/006* (2013.01); *Y02D 30/70* (2020.08)

(58) Field of Classification Search
CPC ......... H04W 74/0866; H04W 74/0833; H04W 74/006; H04W 74/00; H04W 74/002; H04W 74/008; H04W 74/08; Y02D 30/70
See application file for complete search history.

(56) References Cited

U.S. PATENT DOCUMENTS

| 10,736,149 B2 * | 8/2020 | Lu | H04W 74/0833 |
| 2011/0058572 A1 | 3/2011 | Du et al. | |

(Continued)

FOREIGN PATENT DOCUMENTS

| CN | 103582073 A | 2/2014 |
| CN | 105338589 A | 2/2016 |

(Continued)

*Primary Examiner* — Maharishi V Khirodhar
*Assistant Examiner* — Kenneth P Hunt
(74) *Attorney, Agent, or Firm* — Duane Morris LLP

(57) ABSTRACT

The present disclosure provides a method and an apparatus for random access. The method includes: a communication node obtaining random access information, wherein, the random access information comprises the subframe sequence number of the preamble transmission and the radio frame sequence number of the preamble transmission, or the random access information comprises a time domain position index and a frequency domain position index for sending the preamble; the communication node determining the random access radio network temporary identity (RA-RNTI) according to the random access information.

20 Claims, 6 Drawing Sheets

(56) References Cited

U.S. PATENT DOCUMENTS

| | | | |
|---|---|---|---|
| 2016/0150570 | A1 | 5/2016 | Wang |
| 2017/0238345 | A1 | 8/2017 | Liu et al. |
| 2017/0290064 | A1 | 10/2017 | Liu et al. |
| 2019/0037594 | A1* | 1/2019 | Shan .................. H04W 74/004 |
| 2019/0090282 | A1* | 3/2019 | Shi ....................... H04W 76/11 |
| 2020/0187263 | A1* | 6/2020 | Shreevastav ...... H04W 74/0833 |

FOREIGN PATENT DOCUMENTS

| | | |
|---|---|---|
| CN | 105451360 A | 3/2016 |
| JP | 2011-515971 A | 5/2011 |
| WO | 2014180160 A1 | 11/2014 |
| WO | 2015042866 A1 | 4/2015 |
| WO | 2015116732 A1 | 8/2015 |

\* cited by examiner

METHOD AND APPARATUS FOR RANDOM ACCESS

TECHNICAL FIELD

The present application relates to, but is not limited to, the technical field of communications, especially a method and apparatus for random access.

BACKGROUND

Machine Type Communication (MTC) is currently an important focus for research of fifth generation (5G) mobile communication technologies; it is also an important application area for the future of wireless communication. In MTC topic, a research sub-topic of Narrow Band-Internet of thing (NB-IOT) has been proposed for characters of terminal—such as low cost, low power consumption, low mobility, and low throughput, etc; that is, to provide within the frequency band of 200 kHz low-throughput wireless communication services for NB-IoT low-cost user equipment (UE).

In the original Long Term Evolution (LTE) air interface initial establishment process, terminals use competitive mechanisms, and transmit a preamble before initiating a random access (RA) response window in the position of the 3rd subframe after the last subframe of the preamble transmission, whereupon the terminal waits to receive the random access response (RAR) message. The length of the RA response window is configured by system messaging; the largest length is 10 wireless subframes (i.e., 1 wireless frame). Terminals use Random Access-Radio Network Temporary Identity (RA-RNTI) to demodulate the Physical Downlink Control Channel (PDCCH), and then demodulate the Physical Downlink Shared Channel (PDSCH) to obtain the Medium Access Control (MAC) Protocol Data Unit (PDU) containing its RAR. The time frequency position of the preamble determines the value of the RA-RNTI; the base station and the terminal respectively calculate an identical RA-RNTI value based on the preamble time-frequency position. Within the relevant standard, the formula for calculating RA-RNTI is as follows:

$$RA\text{-}RNTI = 1 + t\_id + 10 \times f\_id,$$

Wherein, t_id indicates the sequence number for the initial subframe of the preamble transmission (i.e., the first subframe), and the value range is [1, 10), that is, $0 \leq t\_id < 10$; f_id is the frequency domain position of the Physical Random Access Channel (PRACH) within the subframe, in ascending order, the value range is [0, 6), that is, $0 \leq f\_id < 6$. According to the above formula, the value range for RA-RNTI is [1, 60].

For the Frequency Division Duplexing (FDD) system, f_id is always equal to 0, and the above formula can be simplified as:

$$RA\text{-}RNTI = 1 + t\_id,$$

Wherein, t_id indicates the sequence number of the first subframe of the terminal preamble transmission.

Based on the preceding content, we see: (1) if two terminals transmit the preamble in the same subframe of the same radio frame, their RA response windows overlap, the RA-RNTI of the RAR transmitted by the base station to scramble the PDCCH is also the same, and can only be processed with subsequent interference resolution; (2) if two terminals transmit the preamble in the same subframe of different radio frames, although the RA-RNTI of the RAR transmitted by the base station to scramble the PDCCH is the same, the RA response windows of the RAR received by the two terminals cannot overlap because the RA response windows will not be longer than 1 wireless subframe, and RA response window separation can be used to avoid interference; (3) If the two terminals transmit the preamble in different subframes of different radio frames, different RA-RNTI can be calculated to avoid interference.

In summary, based on the value ranges of RA response windows of relevant standards, the RA-RNTI calculation only needs to reflect the difference between varying initial subframes of preamble transmissions.

But for MTC and NB-IoT communication scenarios, the ability of low-cost terminals to transmit and receive information is limited, or there is poor coverage, so the related research has introduced repetitive functions during uplink transmission and downlink transmission; that is, no matter if the terminal is transmitting uplink messages or the base station is transmitting downlink messages, a certain number of repeat transmissions is enacted to ensure reception. Correspondingly, the required time for the terminal to receive downlink information or the base station to receive uplink information could be extended; therefore, the value range for RA response windows in the related research has been expanded, with the largest being 400 subframes (i.e., 40 radio frames).

The related research has also introduced the concept of coverage rankings to reflect the difference between coverage areas and scenarios. It can be considered that the uplink channels for terminals that are located in the same coverage rankings can use the same repeat factors, and the length of the RA response window can also be the same.

To summarize the preceding analysis, we see that for terminals that transmit the preamble in the same subframe of different radio frames, RA response windows could overlap because the length of RA response windows can exceed 1 radio frame after extension. FIG. 1 is an illustration of the RA response window overlap of two terminals caused by the extension of the RA response window. Within FIG. 1, the subframe with grid markings is the initial subframe position for the preamble transmission; the subframe with slash markings is the RA response window position. However, based on the existing RA-RNTI calculation formula, the RA-RNTI of the two terminals expressed in FIG. 1 is the same; on the one hand, the two terminals may need to demodulate the PDCCH twice within the overlapping RA response window, which will increase power consumption; on the other hand, the two terminals could use the same preamble sequence at the exact same time, and the content of their RAR will be the same, which would require a subsequent interference resolution process, wherein at least one terminal will have a reception failure, which is equivalent to additional interference.

SUMMARY OF THE INVENTION

The following is a brief overview of the main topics described in detail within the present disclosure. This summary is not intended to limit the scope of the present claims. The embodiments of the present invention provide a method and apparatus for random access that can both ensure that additional interference will not occur when there is random access (RA) response window overlap among terminals, and reduce terminal power consumption.

The random access methods of the present embodiments comprise: the communication node obtaining the random access information, wherein, the random access information comprises: the subframe sequence number of the preamble transmission, the radio frame sequence number of the preamble transmission; the communication node determining the RA-RNTI based on the random access information.

The embodiments of the present invention further provide a method for random access, comprising: the communication node obtaining the random access information; wherein, random access information comprises: the time domain position index information of the preamble transmission, the frequency domain position index information of the preamble transmission; the communication node determining the RA-RNTI based on the random access information.

The embodiments of the present invention further provide a method for random access, comprising: the communication node obtaining the random access information, wherein, random access information comprises: the time domain position index information of the terminal preamble transmission, and the frequency domain position index information of the terminal preamble transmission; the communication node determining the RA-RNTI based on the random access information.

The embodiments of the present invention further provide a method for random access, comprising: the communication node obtaining the correlation factors of the random access information; the communication node determining the RA-RNTI according to the random access information correlation factors.

The present invention also provides a random access apparatus, applicable to the communication node and comprising: the information obtainment module, configured to obtain random access information; wherein, random access information comprises: the subframe sequence number of the preamble transmission, the radio frame sequence number of the preamble transmission; a processing module, configured to determine the RA-RNTI according to random access information.

The embodiments of the present invention further provide a method for random access, comprising: a communication node obtaining random access information, and the communication node determining the random access response window related information based on the random access information.

The embodiments of the present invention further provide a method for random access, comprising: the communication node obtaining the random access information; wherein, random access information comprises: the superframe sequence number of the preamble transmission; the communication node determining the RA-RNTI based on the random access information.

Additionally, the present embodiments also provide a computer-readable storage medium stored with computer-executable instructions; the computer executable instructions are executed by a processor to implement any of the preceding methods for random access.

The present embodiments can reflect the factors of differing initial radio frames of preamble transmission or the frequency domain position index information of preamble transmission through the RA-RNTI calculation formula; when RA response windows overlap, the present embodiments both ensure that additional interference will not be created, and reduce power consumption.

After reading and understanding the accompanying drawings and detailed explanations, one can understand other aspects of the present embodiments.

BRIEF DESCRIPTION OF THE DRAWINGS

FIG. 3 is an illustration of Example 1 of Embodiment 5 of the present embodiments;

FIG. 4 is an illustration of Example 2 of Embodiment 5 of the present embodiments;

DETAILED DESCRIPTION OF EXEMPLARY EMBODIMENTS

The present embodiments will now be described in detail with reference to the drawings. It should be noted that the embodiments of the following descriptions are meant only to explain and to describe the present application, and do not serve to limit it.

Figure 1:
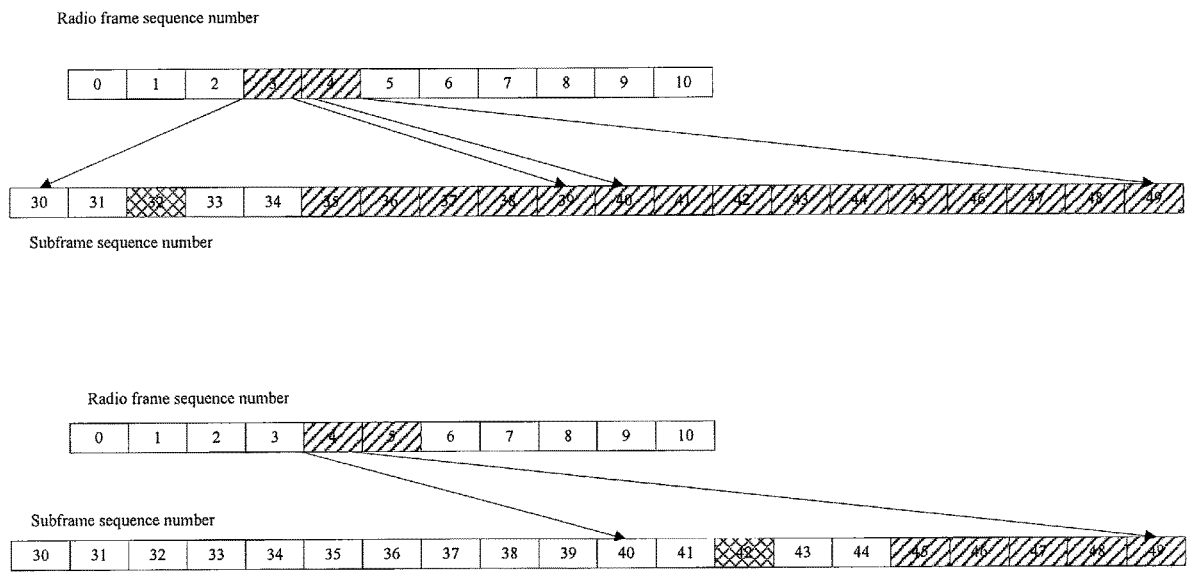
FIG. 1 is an illustration of the RA response window overlap of two terminals caused by the extension of RA response windows.
Figure 2:
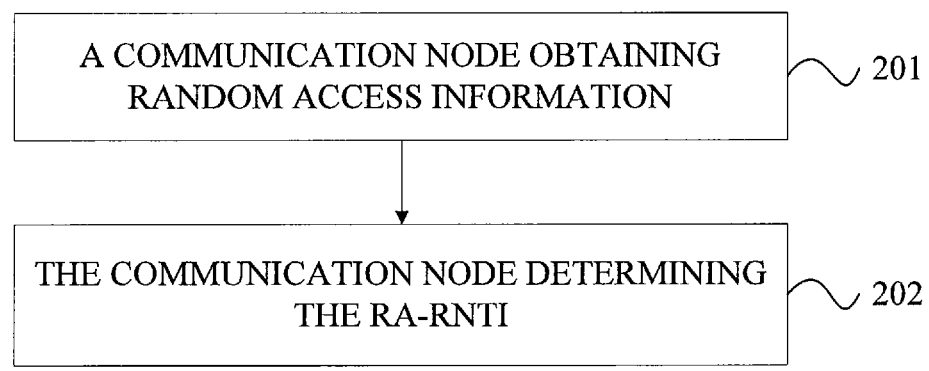
FIG. 2 is a flowchart of a method for random access provided by the present embodiments.

FIG. 2 is a flowchart of a method for random access provided by the present embodiments. As FIG. 2 shows, the present embodiments provide a method for random access, comprising the following steps:

Step 201: a communication node obtaining random access information, wherein, the random access information comprises: the subframe sequence number of the preamble transmission, and the radio frame sequence number of the preamble transmission.

Step 202: a communication node determining the random access radio network temporary identity (RA-RNTI).

Wherein, the communication node is, for example, a terminal or a base station. The terminal can determine the RA-RNTI based on the random access information of the terminal itself, and the base station can determine the RA-RNTI based on the random access information of the corresponding terminal.

Within the preferred embodiment, random access information can comprise: the sequence number of the initial or final subframe of the preamble transmission, the sequence number of the initial or final radio frame of the preamble transmission. However, the embodiments of the present disclosure are not limited thereto. As to the other preferred embodiments, the initial subframe sequence number of the preamble transmission can be determined according to the sequence numbers of non-initial subframe positions and their corresponding information; or, the initial radio frame sequence number can be determined according to the sequence numbers of non-initial radio frame positions and their corresponding information.

Within the preferred embodiment, Step 202 can comprise: a communication node determining RA-RNTI as:

$$RA\_RNTI = n0 + t\_id + k1 \times u\_id;$$

wherein, n0 and k1 are constant coefficients, and t_id is the initial (i.e., the first) subframe sequence number of the preamble transmission; U_id is the initial (i.e., the first) radio frame sequence number of the preamble transmission.

wherein, for example, n0 is 1 and k1 is 10; or, k1=1+MAX (t_id), MAX (t_id) indicates the largest value within the t_id value range, and t_id is the initial subframe sequence number of the preamble transmission.

Within the preferred embodiment, random access information can further comprise: random access (RA) response window length, the interval length of the preamble transmission, wherein, the interval length can be obtained through calculation or pre-configuration.

Within the preferred embodiment, step 202 can comprise: the communication node determining RA-RNTI as: RA_RNTI=n0+t_id+k1×v_id;

wherein, n0 and k1 are constant coefficients, t_id is the initial subframe sequence number of the preamble transmission, and v_id is a comprehensive factor according to one of the following or a combination thereof: the initial radio frame sequence number of the preamble transmission; RA response window length; the interval length of the preamble transmission; the interval length of the preamble transmission, which can be obtained through calculation or pre-configuration; wherein, for example, n0 is 1 and k1 is 10; or, k1=1+MAX (t_id), MAX (t_id) indicates the largest value within the t_id value range, and t_id is the initial subframe sequence number of the preamble transmission.

Within the preferred embodiment, $v\_id = u\_id \bmod WLen$; or, $v\_id = u\_id \bmod (WLen/10)$; or, $v\_id = (u\_id \times 10) \bmod WLen$;

wherein, u_id is the initial radio frame sequence number of the preamble transmission, WLen is the RA response window length, the units are subframes, and mod indicates modulo; wherein, WLen can be replaced by WLen'; WLen'=WLen−2.

Within the preferred embodiment, $v\_id = ((u\_id \times 10)/PRACHWinLen) \bmod WLen$; or, $v\_id = ((u\_id \times 10)/PRACHWinLen) \bmod (WLen/PRACHWinLen)$; or, $v\_id = ((u\_id \times 10)/PRACHWinLen) \bmod (WLen/PRACHWinLen+1)$;

Wherein, u_id is the initial radio frame sequence number of the preamble transmission, PRACHWinLen is the interval length of the preamble transmission, the interval length can be obtained through calculation or pre-configuration, WLen is the RA response window length, the units are subframes, and mod indicates modulo; wherein, WLen can be replaced by WLen'; WLen'=WLen−2.

Within the preferred embodiment, $v\_id = ((u\_id \times 10)/PRACHWinLen) \bmod WLen$; or, $v\_id = ((u\_id \times 10)/PRACHWinLen) \bmod \operatorname{ceil}(WLen/PRACHWinLen)$; or, $v\_id = ((u\_id \times 10)/PRACHWinLen) \bmod (\operatorname{floor}(WLen/PRACHWinLen)+1)$ Wherein, u_id is the initial radio frame sequence number of the preamble transmission, PRACHWinLen is the interval length of the preamble transmission, the interval length can be obtained through calculation or pre-configuration, WLen is the RA response window length, the units are subframes, mod indicates modulo, ceil( ) indicates rounding upward (i.e., returning to the smallest integer greater than or equal to the designated expression), floor( ) indicates rounding downward (i.e., returning to the largest integer smaller than or equal to the designated expression); wherein, WLen can be replaced by WLen'; WLen'=WLen−2.

Within the preferred embodiment, $v\_id = (u\_id/PRACHWinLen) \bmod (WLen/10)$; or, $v\_id = (u\_id/PRACHWinLen) \bmod (WLen/(PRACHWinLen \times 10))$; or, $v\_id = (u\_id/PRACHWinLen) \bmod ((WLen/(PRACHWinLen \times 10))+1)$;

Wherein, u_id is the initial radio frame sequence number of the preamble transmission, PRACHWinLen is the interval length of the preamble transmission, the interval length can be obtained through calculation or pre-configuration, WLen is the RA response window length, the units are subframes, and mod indicates modulo; wherein, WLen can be replaced by WLen'; WLen'=WLen−2.

Within the preferred embodiment, $v\_id = (u\_id/PRACHWinLen) \bmod (WLen/10)$; or, $v\_id = (u\_id/PRACHWinLen) \bmod \operatorname{ceil}(WLen/(PRACHWinLen \times 10))$; or, $v\_id = (u\_id/PRACHWinLen) \bmod (\operatorname{floor}(WLen/(PRACHWinLen \times 10))+1)$;

Wherein, u_id is the initial radio frame sequence number of the preamble transmission, PRACHWinLen is the interval length of the preamble transmission, the interval length can be obtained through calculation or pre-configuration, WLen is the RA response window length, the units are subframes, mod indicates modulo, ceil(indicates rounding upward, and floor( ) indicates rounding downward; wherein, WLen can be replaced by WLen'; WLen'=WLen−2.

Within the preferred embodiment, step 202 can further comprise: a communication node determining RA-RNTI as:

$RA\_RNTI = n0 + (((t\_id + u\_id \times 10)/PRACHWinLen) \bmod WLen)$; or, $RA\_RNTI = n0 + (((t\_id + u\_id \times 10)/PRACHWinLen) \bmod (WLen/PRACHWinLen))$; or, $RA\_RNTI = n0 + (((t\_id + u\_id \times 10)/PRACHWinLen) \bmod (WLen/PRACHWinLen+1))$;

Wherein, t_id is the initial subframe sequence number of the preamble transmission, u_id is the initial radio frame sequence number of the preamble transmission, PRACHWinLen is the interval length of the preamble transmission, the interval length can be obtained through calculation or pre-configuration, the units are subframes, WLen is the RA response window length, mod indicates modulo, and n0 is a coefficient; wherein, for example, n0 is 1; wherein, WLen can be replaced by WLen'; WLen'=WLen−2.

Within the preferred embodiment, PRACHWinLen indicates the interval length of preamble transmission within the same subframe, that is, the interval length between the preamble transmissions within the same subframe of neighboring (the closest) two subframes in different radio frames, using frames as units or subframes as units.

Within the preferred embodiment, PRACHWinLen indicates the interval length of preamble transmission within the same subframe, the interval length can be obtained using the following calculations:

$PRACHWinLen = COM_{PRACH}/N_{PRACH\_PerFrame}$;

Wherein, $COM_{PRACH}$ is $P_{preamble}$ and the least common multiple of $N_{PRACH\_PerFrame}$; $N_{PRACH\_PerFrame}$ indicates the number of PRACH resources configured within every radio frame, $P_{preamble}$ indicates the repeat factors of the preamble.

Within the preferred embodiment, $PRACHWinLen = 10 \times P_{preamble}/N_{PRACH\_PerFrame}$;

Wherein, PRACHWinLen indicates the interval length of the preamble transmission, $N_{PRACH\_PerFrame}$ indicates the number of PRACH resources configured within every radio frame, $P_{preamble}$ indicates the repeat factors of the preamble.

Within the preferred embodiment, PRACHWinLen indicates the interval length of the preamble transmission, and is determined according to one of the following or a combination thereof: the PRACH resource initial radio subframe sequence number; the number of PRACH resources configured within every radio frame; the sequence numbers of subframes configured within every radio frame that can be used for preamble transmission; the preamble format; repeat factors of the preamble.

Within the preferred embodiment, PRACHWinLen indicates the pre-configured interval length of the preamble transmission, and the units can be one of the following: frames, subframes, the maximum number of preamble transmissions.

Within the preferred embodiment, if the sequence number of radio frames currently available for preamble transmission is greater than or equal to $MAX_{FrameIndex}$–PRACHWinLen, then the frames are skipped; the radio frames that can transmit the preamble are re-detected starting from the radio frame with the sequence number of 0, wherein, $MAX_{FrameIndex}$ is the largest value for radio frame sequence numbers.

Within the preferred embodiment, after step 202, the random access method provided by the present embodiment can further comprise: when the determined RA-RNTI exceeds the largest value in the predetermined value range, the communication node determines the RA-RNTI to be a predetermined value.

Within the preferred embodiment, step 202 can comprise: when one of the following types of random access information or a combination thereof correspond to coverage rankings: RA response window length, the repeat factors of the preamble, the interval length of the preamble transmission, then the RA-RNTI calculation also corresponds to such coverage rankings.

It should be noted that the related research has already made it evident that terminals at different coverage rankings can search the PDCCH in different search spaces, that is, even if the two terminals have the same RA-RNTI and the response windows overlap, since the PDCCH that needs to be demodulated is different and the terminals belong to different coverage rankings, additional interference will not be caused. In order to simplify the designing formula, the present application does not take into account the influence of varying coverage rankings when optimizing the RA-RNTI formula.

In addition, for MTC and NB-IoT communication scenarios, even more narrowband resources are introduced, and different terminals can transmit the preamble in different narrowband positions as well as receive the RAR in the corresponding positions. In order to simplify the designing formula, the present application does not take into account the influence of varying narrowband resources when optimizing the RA-RNTI formula.

Additionally, the embodiments of the present disclosure further provide a method for random access, comprising: the communication node obtaining the random access information, wherein, random access information comprises: the time domain position index information of the preamble transmission, the frequency domain position index information of the preamble transmission; the communication node determining the RA-RNTI according to random access information; wherein, when the number of radio frames or subframes is insufficient, frequency domain information can be added into the RA-RNTI calculation.

Within the preferred embodiment, the communication node determining the RA-RNTI according to random access information can further comprise: a communication node determining RA-RNTI as:

$$RA\_RNTI = n0 + t\_id + k1 \times v\_id + WLen \times w\_id;$$

wherein, n0 and k1 are coefficients, t_id is the initial subframe sequence number of the preamble transmission; w_id is the frequency domain position index of the preamble transmission; WLen is the length of the RA response window; v_id is a comprehensive factor determined by one of the following or a combination thereof: the radio frame sequence number of the preamble transmission; the PRACH resource initial radio subframe sequence number; the RA response window length; the interval length of the preamble transmission; the interval length can be obtained through calculation or pre-configuration; wherein, for example, n0 is 1 and k1 is 10; or, k1=1+MAX (t_id), MAX (t_id) indicates the largest value within the t_id value range, and t_id is the initial subframe sequence number of the preamble transmission.

Within the preferred embodiment, $$v\_id = (u\_id/PRACHWinLen) \bmod (WLen/10); \text{ or,}$$

$$v\_id = (u\_id/PRACHWinLen) \bmod \text{ceil}(WLen/(PRACHWinLen \times 10)); \text{ or,}$$

$$v\_id = (u\_id/PRACHWinLen) \bmod (\text{floor}(WLen/(PRACHWinLen \times 10)) + 1);$$

Wherein, u_id is the initial radio frame sequence number of the preamble transmission, PRACHWinLen is the interval length of the preamble transmission, the interval length can be obtained through calculation or pre-configuration, WLen is the RA response window length, the units are subframes, mod indicates modulo, ceil( ) indicates rounding upward, and floor( ) indicates rounding downward.

Within the preferred embodiment, PRACHWinLen indicates the interval length of preamble transmission within the same subframe, that is, the interval length between the preamble transmissions within the same subframe of two neighboring (the closest) subframes in different radio frames, using frames as units or subframes as units.

Within the preferred embodiment, PRACHWinLen indicates the interval length of preamble transmission within the same subframe, the interval length can be obtained using the following calculations:

$$PRACHWinLen = COM_{PRACH}/N_{PRACH\_PerFrame};$$

Wherein, $COM_{PRACH}$ is the least common denominator of $P_{preamble}$ and $N_{PRACH\_PerFrame}$;
$N_{PRACH\_PerFrame}$ indicates the number of PRACH resources configured within every radio frame, $P_{preamble}$ indicates the repeat factors of the preamble.

Within the preferred embodiment, WLen can be replaced by WLen', wherein, $$WLen' = n0 + MAX(t\_id) + k1 \times MAX(u\_id),$$

MAX (t_id) indicates the largest value within the t_id value range, MAX (u_id) indicates the largest value within the u_id value range, u_id is the initial radio frame sequence number of the preamble transmission, and t_id is the initial subframe sequence number of the preamble transmission; wherein, for example, n0 is 1 and k1 is 10; or, k1=1+MAX (t_id), MAX (t_id) indicates the largest value within the t_id value range, t_id is the initial subframe sequence number of the preamble transmission.

Within the preferred embodiment, after the communication node determines the RA-RNTI according to random access information, the method for random access of the present embodiments can further comprise: when the determined RA-RNTI exceeds the largest value in the predetermined value range, the communication node determines the RA-RNTI to be a predetermined value.

Within the preferred embodiment, the communication node determining the RA-RNTI according to random access information can comprise:

When one of the following types of random access information or a combination thereof corresponds to coverage level: RA response window length, the repeat factors of the preamble, the interval length of the preamble transmission, then the RA-RNTI calculation also corresponds to such coverage rankings.

Additionally, the embodiments of the present disclosure further provide a method for random access, comprising: the communication node obtaining the random access information, wherein, random access information comprises: the terminal time domain position index information of the preamble transmission, the terminal frequency domain position index information of the preamble transmission; the communication node determining the RA-RNTI according to random access information.

Within the preferred embodiment, random access information can further comprise one of the following or a combination thereof: RA response window length, the interval length of the preamble transmission; the interval length can be obtained through calculation or pre-configuration.

Within the preferred embodiment, the communication node determining the RA-RNTI according to random access information can comprise: a communication node determining RA-RNTI as:

$$RA\_RNTI = n0 + s\_id + w\_id \times PRACHWinLen;$$

Wherein, n0 is a coefficient, s_id is the time domain position index of the terminal preamble transmission, w_id is the frequency domain position index of the terminal preamble transmission, PRACHWinLen is the interval length of the preamble transmission; the interval length can be obtained through calculation or pre-configuration; wherein, for example, n0 is 1.

Within the preferred embodiment, PRACHWinLen indicates the interval length of preamble transmission within the same subframe, that is, the interval length between the preamble transmissions within the same subframe of two neighboring (closest) subframes in different radio frames, using frames as units or subframes as units.

Within the preferred embodiment, PRACHWinLen indicates the interval length of preamble transmission within the same subframe, the interval length can be obtained using the following calculations:

$$PRACHWinLen = COM_{PRACH}/N_{PRACH\_PerFrame};$$

Wherein, $COM_{PRACH}$ is the least common denominator of $P_{preamble}$ and $N_{PRACH\_PerFrame}$;

$N_{PRACH\_PerFrame}$ indicates the number of PRACH resources configured within every radio frame, and $P_{preamble}$ indicates the repeat factors of the preamble.

Within the preferred embodiment, $PRACHWinLen = 10 \times P_{preamble}/N_{PRACH\_PerFrame}$;

Wherein, PRACHWinLen indicates the interval length of the preamble transmission, $N_{PRACH\_PerFrame}$ indicates the number of PRACH resources configured within every radio frame, $P_{preamble}$ indicates the repeat factors of the preamble.

Within the preferred embodiment, PRACHWinLen indicates the interval length of the preamble transmission, and can be determined according to one of the following or a combination thereof: the PRACH resource initial radio subframe sequence number; the number of PRACH resources configured within every radio frame; the subframe sequence numbers configured within every radio frame that can be used for preamble transmission; the preamble format; and the repeat factors of the preamble.

Within the preferred embodiment, PRACHWinLen indicates the pre-configured interval length of the preamble transmission, the units can be one of the following: frames, subframes, the maximum number of preamble transmissions.

Within the preferred embodiment, the communication node determining the RA-RNTI according to random access information can comprise: a communication node determining RA-RNTI as:

$$RA\_RNTI = n0 + w\_id + s\_id \times PRACHFreLen;$$

Wherein, n0 is a coefficient, s_id is the time domain position index of the preamble transmission, w_id is the frequency domain position index of the preamble transmission, PRACHFreLen is the frequency domain interval length of the preamble transmission or the maximum number of preambles that can be transmitted in frequency domain multiplexing; wherein, for example, n0 is 1; wherein, the maximum number of preambles that can be transmitted in frequency domain multiplexing can be, for example, the maximum number of terminals or the maximum number of preambles.

Within the preferred embodiment, PRACHFreLen indicates the frequency domain interval length of the preamble transmission, and can be determined according to one of the following or a combination thereof: the frequency resource configuration information used to transmit the preamble on the physical random access channel, and the frequency hopping mode.

Within the preferred embodiment, time domain position index information can comprise any of the following: the subframe sequence number of the preamble transmission; the radio frame sequence number of the preamble transmission.

Within the preferred embodiment, the frequency domain position index information can comprise any of the following: the initial frequency domain position index of the preamble transmission; the frequency domain position offset of the preamble transmission; the frequency domain subcarrier index of the preamble transmission.

Within the preferred embodiment, after the communication node determines the RA-RNTI according to random access information, the method for random access of the present embodiments can further comprise: when the RA-RNTI is determined to exceed the largest value within the predetermined value range, the communication node determines that the RA-RNTI is a predetermined value.

Within the preferred embodiment, the communication node determining the RA-RNTI according to random access information can comprise: when one of the following types of random access information or a combination thereof corresponds to coverage rankings: RA response window length, the repeat factors of the preamble, the interval length of the preamble transmission, then the RA-RNTI calculation also correspond to such coverage rankings.

Additionally, the embodiments of the present invention further provide a method for random access, comprising: the communication node obtaining the random access information correlation factors; the communication node determining the RA-RNTI according to the random access information correlation factors.

Within the preferred embodiment, the communication node determining the RA-RNTI according to the random access information correlation factors can comprise: a communication node determining RA-RNTI as:

$$RA\text{-}RNTI = n0 + \sum_{i=1}^{N} K_i \times c_i;$$

Wherein, n0 is a coefficient, N is the number of random access correlation factors, $c_i$ is the random access information correlation factor, $$K_i = n0 + \sum_{i=1}^{N} (K_{i-1} \times \text{MAX}(c_{i-1})),$$

MAX $(c_{i-1})$ indicates the largest value of $c_{i-1}$; wherein, for example, n0 is 1.

Within the preferred embodiment, the random access information correlation factor can comprise any of the following or a combination thereof: the initial subframe sequence number of the preamble transmission; the initial radio frame sequence number of the preamble transmission; the number of PRACH resources configured within every radio frame; repeat factors of the preamble; the sequence number of the final subframe of the preamble transmission; the sequence number of the final radio frame of the preamble transmission; the frequency domain position offset of the preamble transmission; the frequency domain subcarrier index of the preamble transmission; and the RA response window length.

Within the preferred embodiment, after the communication node determines the RA-RNTI according to the random access information correlation factors, the method for random access of the present embodiments can further comprise: when the determined RA-RNTI exceed the largest value in the predetermined value range, the communication node determines the RA-RNTI to be a predetermined value.

Within the preferred embodiment, the communication node determining the RA-RNTI according to the random access information correlation factors can comprise:

When one of the following types of random access information or a combination thereof corresponds to coverage rankings: RA response window length, the repeat factors of the preamble, the interval length of the preamble transmission, then the RA-RNTI calculation also corresponds to such coverage rankings.

In what follows the calculation methods of RA-RNTI provided by the present disclosure are exemplified with a number of embodiments.

Embodiment 1

Within the present embodiment, RA_RNTI=1+t_id+10×u_id, wherein, t_id is the first subframe sequence number of the terminal preamble transmission, u_id is the first radio frame sequence number of the terminal preamble transmission.

Wherein, the value range of u_id is [0, 1023], the value range of t_id is [1, 10); therefore, based on the RA-RNTI calculation formula of the present embodiment, the range of values for RA-RNTI is [1, 10240].

Embodiment 2

Within the present embodiment, RA_RNTI=1+t_id+10×v_id,

Wherein, t_id is the first subframe sequence number of the terminal preamble transmission, v_id is a comprehensive factor taking into account the sequence number of the first radio frame of the terminal preamble transmission, the RA response window length of the present coverage ranking, and the interval length (using radio subframes as units) of the terminal preamble transmission.

Within the present embodiment, v_id=((u_id×10)/PRACHWinLen) mod WLen, wherein, u_id is the first radio frame sequence number of the terminal preamble transmission. PRACHWinLen is a preamble transmission interval length calculated based on the PRACH resource configuration and the repeat factors of the preamble (hereinafter referred to as repeat factors) in the present coverage ranking. Here, the terminal can calculate the PRACHWinLen based on the sequence number of subframes and repeat factors that can be used to transmit the preamble configured within every radio frame of the base station. WLen is the RA response window length of the present coverage ranking (using radio subframes as units).

Based on the calculation formula of the present embodiment, the range of RA-RNTI values is [1, 10×WLen]. With the largest WLen=400 subframes as an example, the RA-RNTI value range is [1, 4000].

Embodiment 3

Within the present embodiment, RA_RNTI=1+t_id+10×v_id,

Wherein, t_id is the first subframe sequence number of the terminal preamble transmission, v_id is a comprehensive factor taking into account the sequence number of the first radio frame of the terminal preamble transmission, the RA window length of the current terminal coverage ranking, and the interval length of the terminal preamble transmission (using radio subframes as units). Within the present embodiment, v_id=((u_id×10)/PRACHWinLen) mod WLen, wherein, u_id is the sequence number of the first radio frame of the terminal preamble transmission. PRACHWinLen is the interval length of the preamble transmission calculated based on the PRACH resource configuration and the repeat factors of the preamble of the present coverage ranking; wherein, the PRACHWinLen can be simply deduced according to the following formula:

PRACHWinLen=10×$P_{preamble}$/$N_{PRACH\_PerFrame}$, wherein, $P_{preamble}$ indicates the repeat factors of the preamble under the terminal's current coverage ranking; here $N_{PRACH\_PerFrame}$ indicates the number of PRACH resources configured within every radio frame of the base station; wherein, WLen is the RA response window length (using radio subframes as units) of the present coverage ranking.

Based on the calculation formula of the present embodiment, the range of RA-RNTI values is [1, 10×WLen]. With the largest WLen=400 subframes as an example, the RA-RNTI value range is [1, 4000].

Embodiment 4

Within the present embodiment, RA RNTI=+(((t_id+u_id×10)/PRACHWinLen) mod WLen), Wherein, t_id the initial subframe sequence number of the terminal preamble transmission, u_id the initial radio frame sequence number of the terminal preamble transmission, PRACHWinLen is the interval length of the terminal preamble transmission determined according to the PRACH resource configuration information and the repeat factors of the preamble under the terminal's current coverage ranking, WLen is the RA response window length under the terminal's current coverage ranking, and mod indicates modulo. Wherein, for the values of the above parameters one can reference Embodiment 2 or Embodiment 3; it will not be repeated here.

Embodiment 5

For the same coverage ranking, the PRACH repeat factors for every user are identical; therefore, the PRACHWinLen should also be the same. In this way, the available PRACH resources can be grouped according to the PRACHWinLen, and each group of available PRACH resources can only be occupied by one user. Therefore, the RA response window can be further classified into several PRACH resource groups according to the PRACHWinLen, and it can be assumed that the maximum number of users for overlap in the RA response window is equal to the number of usable PRACH resources plus one (the base user and other users able to transmit the preamble and initiate the RA response window within the RA response window of that user), and the actual frame number of these users can be mapped to a set of consecutive frame numbers able to create RA response window overlap.

Within the present embodiment, RA_RNTI=1+t_id+10×v_id, wherein, t_id is the first subframe sequence number of the terminal preamble transmission, v_id is a comprehensive factor taking into account the sequence number of the first radio frame of the terminal preamble transmission, the RA response window length of the terminal's current coverage ranking and the interval length of the terminal preamble transmission (using radio subframes as units).

Within the present embodiment, v_id=((u_idx10)/PRACHWinLen) mod (WLen/PRACHWinLen+1), wherein, u_id is the sequence number of the first radio frame of the terminal preamble transmission; PRACHWinLen indicates the interval length of the preamble transmission; the calculation method is the same as Embodiment 2 or Embodiment 3, and will not be repeated here; WLen is the RA response window length under the present coverage ranking (using subframes as units).

Based on the calculation formula of the present embodiment, the range of RA-RNTI values is [1, 10×(WLen/PRACHWinLen+1)].

Taking the largest WLen=400 subframes as an example, there are 8 repeat factors, every radio frame has 2 radio subframes configured as PRACH resources, and the RA-RNTI value range is [1, 110].

Typically the base station will reasonably configure the RA response window size according to the repeat factors; the larger the repeat factor, the longer the RA response window. Therefore, under reasonable configuration, the RA-RNTI value range can be further reduced.

Additionally, with actual implementation, if the ratio of WLen and PRACHWinLen is not a integer, it needs to be rounded, and then calculated according to the formula. Wherein, the rounding method is, for example, rounding downward. The present embodiment is not however limited thereto.

In addition, considering the RA response windows of two neighboring users that are not entirely overlapping, they will be separated by at least one subframe before or after each; therefore, the WLen of the above formula provided by the present embodiment can be replaced with WLen', wherein, WLen'=WLen−2.

Embodiment 5 is exemplified by the following examples.

Example 1

Figure 3:
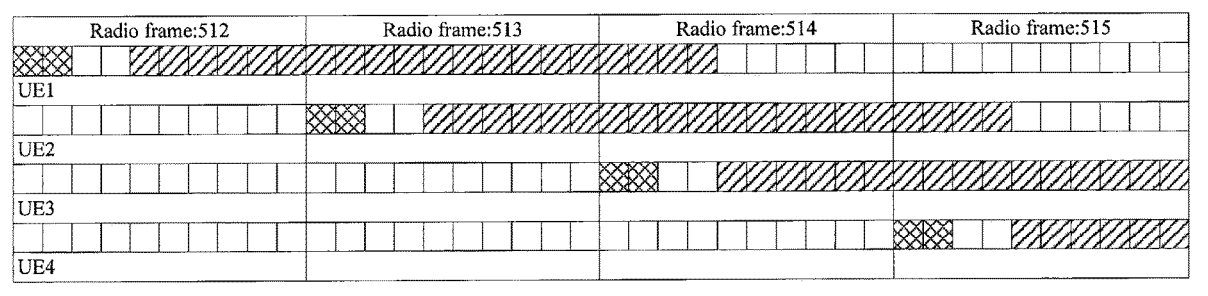

Suppose there are 2 repeat factors, every radio frame has 2 subframes configured as PRACH resources, and the RA response window length is 20; it is then necessary to distinguish the user scenario of RA_RNTI as shown in FIG. 3. Wherein, the subframes with grid markings are the preamble transmission positions, and the subframes with slash markings are the RA response window positions.

Within the present example, we know from the calculation formula of Embodiment 5 that:

PRACHWinLen=10×repeat factor/$N_{PRACH\_PerFrame}$=10×2/2=10;

RA_RNTI of UE1=1+0+10×((512×10/10)mod($\lfloor$(20−2)/10$\rfloor$+1))=1+0+10×(512 mod 2)=1+0=1;

RA_RNTI of UE2=1+0+10×((513×10/10)mod($\lfloor$(20−2)/10$\rfloor$+1))=1+0+10×(513 mod 2)=1+10=11;

RA_RNTI of UE3=1+0+10×((514×10/10)mod($\lfloor$(20−2)/10$\rfloor$+1))=1+0+10×(514 mod 2)=1+0=1

RA_RNTI of UE4=1+0+10×((515×10/10)mod($\lfloor$(20−2)/10$\rfloor$+1))=1+0+10×(515 mod 2)=1+10=11.

Wherein, $\lfloor \ \rfloor$ indicates rounding downward.

Although the RA-RNTI of UE1 and UE3 are identical, and the RA-RNTI of UE2 and UE4 are identical, it is allowable since their response windows do not overlap.

Example 2

Figure 4:
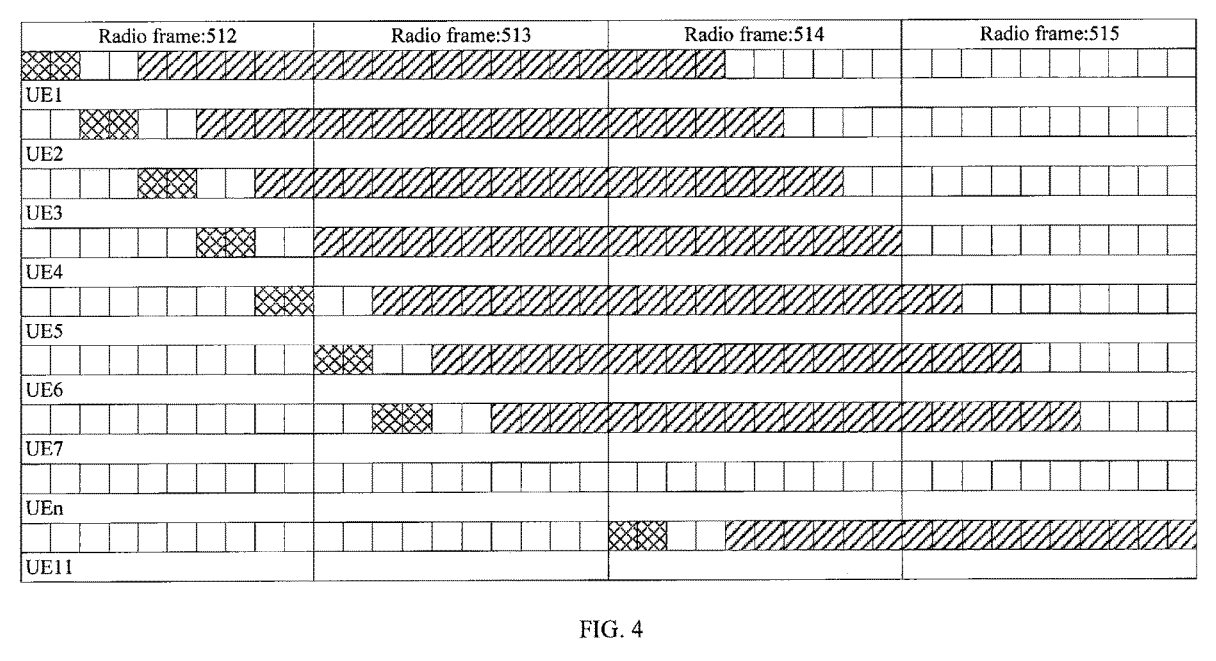

Suppose there are 2 repeat factors, every radio frame has 10 subframes configured as PRACH resources, and the RA response window length is 20; it is then necessary to distinguish the user scenario of RA_RNTI as shown in FIG. 4. Wherein, the subframes with grid markings are the preamble transmission positions, and the subframes with slash markings are the RA response window positions.

Within the present example, we know from the calculation formula of Embodiment 5 that:

PRACHWinLen=10×repeat factor/$N_{PRACH\_PerFrame}$=10×2/10=2;

RA_RNTI of UE1=1+0+10×((512×10/2)mod((20−2)/2+1))=1+0+10×(2560 mod 10)=1+0=1;

RA_RNTI of UE2=1+2+10×((512×10/2)mod((20−2)/2+1))=1+2+10×(2560 mod 10)=3+0=3;

RA_RNTI of UE3=1+4+10×((512×10/2)mod((20−2)/2+1))=1+4+10×(2560 mod 10)=5+0=5;

RA_RNTI of UE4=1+6+10×((512×10/2)mod((20−2)/2+1))=1+6+10×(2560 mod 10)=7+0=7;

RA_RNTI of UE5=1+8+10×((512×10/2)mod((20−2)/2+1))=1+8+10×(2560 mod 10)=9+0=9;

RA_RNTI of UE6=1+0+10×((513×10/2)mod((20−2)/2+1))=1+0+10×(2565 mod 10)=1+50=51;

. . .

RA_RNTI of UE9=1+6+10×((513×10/2)mod((20−2)/2+1))=1+6+10×(2565 mod 10)=7+50=57;

RA_RNTI of UE10=1+8+10×((513×10/2)mod((20−2)/2+1))=1+8+10×(2565 mod 10)=9+50=59;

RA_RNTI of UE11=1+0+10×((514×10/2)mod((20−2)/2+1))=1+0+10×(2570 mod 10)=1+0=1.

Although the RA-RNTI of UE1 and UE11 are identical, it is allowable since their response windows do not overlap.

Embodiment 6

Within the present embodiment,

RA_RNTI=1+(((t_id+u_id×10)/PRACHWinLen)mod (WLen/PRACHWinLen+1)),

Wherein, t_id the initial subframe sequence number of the terminal preamble transmission, u_id the initial radio frame sequence number of the terminal preamble transmission, PRACHWinLen is the interval length of the preamble transmission determined based on the PRACH resource configuration information and the repeat factors of the preamble under the terminal's current coverage ranking. Wherein, WLen is the RA response window length of the terminal's current coverage ranking, and mod indicates modulo. Wherein, for the values of the above parameters one can refer to Embodiment 2 or Embodiment 3; they will not be repeated here.

Embodiment 7

Within the present embodiment, RA_RNTI=1+t_id+10×v_id;

Wherein, t_id is the first subframe sequence number of the terminal preamble transmission, v_id is a comprehensive factor taking into account the sequence number of the first radio frame of the terminal preamble transmission, the RA response window length of the terminal's current coverage ranking, and the interval length of the terminal preamble transmission (using radio subframes as units), wherein, v_id=((u_id×10)/PRACHWinLen) mod (WLen/PRACHWinLen), wherein, u_id is the sequence number of the first radio frame of the terminal preamble transmission. PRACHWinLen is the interval length of the preamble transmission calculated based on the PRACH resource configuration and the repeat factors of the preamble under the current coverage ranking. WLen is the RA response window length of the terminal's current coverage ranking, and mod indicates modulo. Wherein, for the values of the above parameters one can refer to Embodiment 2 or Embodiment 3; they will not be repeated here.

Embodiment 8

Within the present embodiment,

RA_RNTI=1+(((t_id+u_id×10)/PRACHWinLen)mod (WLen/PRACHWinLen)),

Wherein, t_id is the initial subframe sequence number of the terminal preamble transmission, u_id is the initial radio frame sequence number of the terminal preamble transmission, PRACHWinLen is the interval length of the preamble transmission determined based on the PRACH resource configuration information and the repeat factors of the preamble under the terminal's current coverage ranking. WLen is the RA response window length of the terminal's current coverage ranking, and mod indicates modulo. Wherein, for the values of the above parameters one can refer to Embodiment 2 or Embodiment 3, and thus will not be repeated here.

In addition, considering the RA response windows of two neighboring users that are not entirely overlapping, they will be separated by at least one subframe before or after each; therefore, the WLen of the formulas provided by Embodiment 2 through Embodiment 8 can be replaced by WLen'; Wherein, WLen'=WLen−2.

Embodiment 9

Within the present embodiment, RA_RNTI=1+s_id+w_id×PRACHWinLen,

Wherein, s_id is the initial subframe sequence number of the terminal preamble transmission, w_id the initial frequency domain position index of the terminal preamble transmission, PRACHWinLen is the interval length of the terminal preamble transmission; wherein, for the PRACHWinLen values one can refer to Embodiment 2 or Embodiment 3; they will not be repeated here.

Embodiment 10

Within the present embodiment, RA_RNTI=1+w_id+s_id×PRACHFreLen,

Wherein, s_id is the initial subframe sequence number of the preamble transmission, w_id is the frequency domain position index of the preamble transmission, and PRACHFreLen is the frequency domain interval length of the preamble transmission, wherein, PRACHFreLen can be determined according to one of the following or a combination thereof: the frequency resource configuration information used to transmit the preamble on the physical random access channel, and the frequency hopping mode.

Embodiment 11

Within the present embodiment, A_RNTI=n0+t_id+k1×v_i,

Wherein, n0 and k1 are coefficients, t_id is the initial subframe sequence number of the preamble transmission, v_id is a comprehensive factor determined by one of the following or a combination thereof: the initial radio frame sequence number of the preamble transmission; the RA response window length; the interval length of the preamble transmission; the interval length can be obtained through calculation or pre-configuration.

Wherein, for example, n0 is 1 and k1 is 10; or, k1=1+MAX (t_id), MAX (t_id) indicates the largest value within the t_id value range, and t_id is the initial subframe sequence number of the preamble transmission.

Wherein, v_id=u_id mod WLen; or, v_id=u_id mod(WLen/10); or, v_id=(u_id×10)mod WLen;

Wherein, u_id is the first radio frame sequence number of the terminal preamble transmission, WLen is the RA response window length under the present coverage ranking (using radio subframes as units), and mod indicates modulo.

Figure 5:
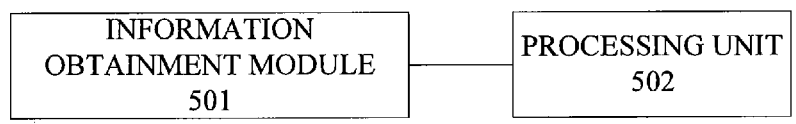
FIG. 5 is an illustration of an apparatus for random access provided by the present embodiments.

FIG. 5 is an illustration of the random access apparatus of the present invention. As FIG. 5 shows, the random access apparatus provided by the present embodiments can be applied to the communication node, and comprises: information obtainment module 501, configured to obtain random access information; processing module 502, configured to determine RA-RNTI according to random access information.

Random access information can comprise: the subframe sequence number of the preamble transmission, the radio frame sequence number of the preamble transmission. Alternatively, random access information can comprise: the time domain position index information of the preamble transmission, the frequency domain position index information of the preamble transmission. Alternatively, random access information can comprise: the time domain position index information of the terminal preamble transmission, the frequency domain position index information of the terminal preamble transmission.

Within the preferred embodiment, random access information can further comprise: RA response window length, the interval length of the preamble transmission. Wherein, the interval length can be obtained through calculation or pre-configuration Additionally, the present invention also provides a random access apparatus, applicable to the communication node and comprising: information obtainment module, configured to obtain random access information correlation factors; processing module, configured to determine the RA-RNTI according to the random access information correlation factors.

For practical application, the function of the information obtainment module can be implemented, for example, from the wireless communication unit and a calculator. The present embodiment is not however limited thereto. The functions of the above apparatus can also be implemented by processors executing code and/or instructions stored on memory.

In addition, for the related processing procedure of the random access apparatus provided by the present embodiments, one can refer to the description of the methods of the above embodiments; it will not be repeated here.

For practical application, using the FDD system as an example, the primary scenario that causes additional interference is two terminals of the same coverage ranking located within the same subframe of different radio frames transmitting the preamble: their response window length exceeds one radio frame, and they overlap. Based on the existing RA-RNTI calculation formula containing only subframe information, both terminals have the same RA-RNTI for demodulating the PDCCH in the same search space, which creates additional interference. With regard to this, the embodiments of the present invention use the RA-RNTI formula to introduce a factor able to reflect the difference of the initial radio frames of the preamble transmission, or to reflect the frequency domain position index information, and thus ensure that RA response window overlap will not produce additional interference, which will reduce terminal power consumption.

Figure 6:
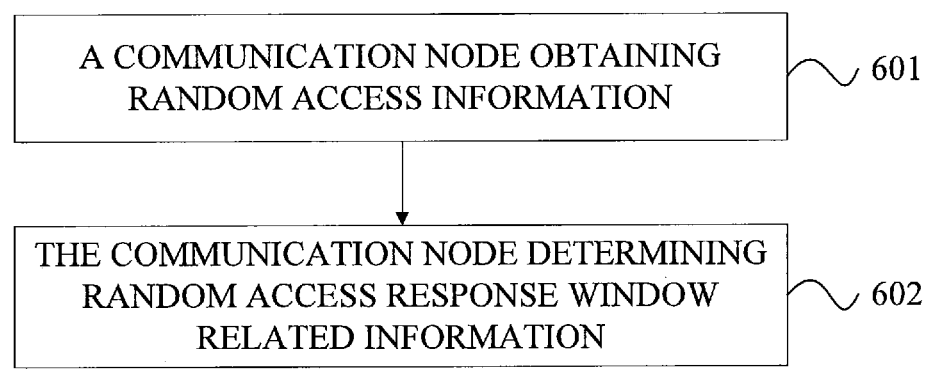
FIG. 6 is a flowchart of another method for random access provided by the present embodiments.

As FIG. 6 shows, the present embodiments further provide a method for random access comprising the following steps:

Step 601: the communication node obtains random access information;

Step 602: the communication node determines the random access response window related information based on the random access information.

Wherein, random access information can comprise one of the following or a combination thereof: downlink channel repeat information, or a function with it as its input; downlink control transmission period (PDCCH period), or a function with it as its input; downlink control channel transmission interval (PDCCH transmission duration), or a function with it as its input; downlink shared channel transmission period (PDSCH period), or a function with it as its input; downlink shared channel transmission interval (PDSCH transmission duration), or a function with it as its input; uplink channel repeat information, or a function with it as its input; uplink access channel transmission period (PRACH period), or a function with it as its input; uplink access channel transmission interval (PRACH transmission duration), or a function with it as its input.

Wherein, random access response window related information can comprise: random access response window start time; random access response window initial time domain position; the interval between the random access response window start time and the leading transmission end time.

Additionally, the embodiments of the present disclosure also provide a method for random access comprising the following steps: the communication node obtaining the random access information; wherein, random access information comprises: the super frame sequence number of the preamble transmission; the communication node determining the RA-RNTI according to random access information.

Within the preferred embodiment, the communication node determining the RA-RNTI according to random access information can further comprise: a communication node determining RA-RNTI as:

$$RA\_RNTI = n0 + k1 \times HSFN\_id;$$

Wherein, n0 and k1 are coefficients, HSFN_id is the superframe sequence number of the preamble transmission.

Within the preferred embodiment, the communication node determining the RA-RNTI according to random access information can further comprise: a communication node determining RA-RNTI as:

$$RA\_RNTI = n0 + k1 \times f(HSFN\_id);$$

Wherein, n0 and k1 are coefficients, f( ) indicates a function that takes HSFN_id as its input, HSFN_id is the superframe sequence number of the preamble transmission.

Within the preferred embodiment, the communication node determining the RA-RNTI according to random access information can further comprise: a communication node determining RA-RNTI as:

$$RA\_RNTI = n0 + m \times f(ki, C_i);$$

Wherein, f( ) indicates a function that takes ki, $C_i$ as its input; $C_i$ is random access information; n0, m, and ki are coefficients.

Within the preferred embodiment, random access information can comprise one of the following or a combination thereof: the superframe sequence number of the preamble transmission (HSFN_id), or a function with it as its input; the radio frame sequence number of the preamble transmission (SFN_id), or a function with it as its input; the subframe sequence number of the preamble transmission (sub-SFN_id), or a function with it as its input; the frequency domain position index of the preamble transmission (f_id), or a function with it as its input; the frequency domain offset of the preamble transmission (f_offset), or a function with it as its input; the subcarrier index of the preamble transmission (tone_id), or a function with it as its input; the band index of the preamble transmission (band_id), or a function with it as its input; the transmission period of the downlink control channel (PDCCH period) or a function with it as its input; wherein, units for the PDCCH period can be superframes, frames, subframes, seconds (s), milliseconds (ms), or other units of time; the transmission period on the random access channel (PRACH period), or a function with it as its input; wherein, units for the PRACH period can be superframes, frames, subframes, s, ms, or other units of time; the interval length of the preamble transmission (Preamble period), or a function with it as its input; wherein, the interval length can be obtained through calculation or pre-configuration, and units for the Preamble period can be the PRACH period, the PDCCH period, superframes, frames, subframes, s, ms, or other units of time; the RA response window length (W_RAR), or a function with it as its input; wherein, units for the W_RAR can be the PDCCH period, the PRACH period, superframes, frames, subframes, s, ms, or other units of time; the maximum length ($M_{W\_RAR}$) sustained by the RA response window length (W_RAR); wherein, units for the $M_{W\_RAR}$ can be the PDCCH period, the PRACH period, superframes, frames, subframes, s, ms, or other units of time; the number of radio frames contained within a superframe (HSFN number), or a function with it as its input; the number of effective subframes sustained in the downlink control channel search space (Rmax), or a function with it as its input; the number of repetitions on the downlink control channel (Ri), or a function with it as its input.

Within the preferred embodiment, the communication node determining the RA-RNTI according to random access information can further comprise: a communication node determining RA-RNTI as:

RA-RNTI=n0+k1×band_id+k2×floor(SFN_id/minPeriod)+k2×ceil(HSFNnumber/minPeriod)×(HSFN_id mod $M_{W\_RAR}$); wherein, n0 is a coefficient, minPeriod is the smallest period of random access, the unit for minPeriod is frames, $M_{W\_RAR}$ is the maximum length sustained by the RA response window length (W_RAR), the unit for $M_{W\_RAR}$ is superframes; floor( ) indicates rounding downward, ceil( ) indicates rounding upward; ki is a positive integer, i=1, 2; for example, k1 could be 1, and k2 could be the maximum number of bands in the system (e.g., 4); band_id is the frequency band index of the preamble transmission, SFN_id is the radio frame sequence number of the preamble transmission, HSFNnumber is the number of radio frames contained within a superframe, HSFN_id is the superframe sequence number of the preamble transmission.

Within the preferred embodiment, the communication node determining the RA-RNTI according to random access information can further comprise: a communication node determining RA-RNTI as:

RA-RNTI=n0+k1×band_id+k2×floor(SFN_id/minPeriod)+floor (Rmax/z)×[k2×ceil(HSFNnumber/minPeriod)×(HSFN_id mod $M_{W\_RAR}$)], wherein, n0 is a coefficient, minPeriod is the smallest period of random access, the unit for minPeriod is frames, $M_{W\_RAR}$ is the largest length sustained by the RA response window length (W_RAR), the unit for $M_{W\_RAR}$ is superframes; floor( ) indicates rounding downward, ceil( ) indicates rounding upward; z is the first threshold value, and the value range is positive integers; for example, z could be one of the following: 2048, 1024, 512, 256, 128, 64; wherein, ki could be a positive integer, i=1, 2. For example, k1 could be 1, and k2 could be the maximum number of bands within the system (e.g., 4), band_id is the band index of the preamble transmission, SFN_id is the radio frame sequence number of the preamble transmission, HSFNnumber is the number of radio frames contained within a superframe, HSFN_id is the superframe sequence number of the preamble transmission, Rmax is the number of effective subframes in the downlink control channel search space.

Within the preferred embodiment, the communication node determining the RA-RNTI according to random access information can further comprise: a communication node determining RA-RNTI as:

RA-RNTI=n0+k1×band_id+k2×[floor (Rmax/z)×(HSFN_id mod $M_{W\_RAR}$)]+k3×floor(SFN_id/minPeriod), wherein, n0 is a coefficient, floor( ) indicates rounding downward; z is the first threshold value, and the value range is positive integers; for example, z could be one of the following: 2048, 1024, 512, 256, 128, 64; wherein, the value of ki is the maximum value after summing one or more factors preceding it, i=1, 2, 3. For example, k1 could be 1, and k2 could be the maximum number of bands within the system (e.g., 4), $M_{W\_RAR}$ is the largest length sustained by the RA response window length (W_RAR), band_id is the band index of the preamble transmission, SFN_id is the radio frame sequence number of the preamble transmission, Rmax is the number of effective subframes sustained in the downlink control channel search space, HSFN_id is the superframe sequence number of the preamble transmission, minPeriod is the smallest period of random access.

Within the preferred embodiment, the communication node determining the RA-RNTI according to random access information can further comprise: a communication node determining RA-RNTI as:

RA-RNTI=n0+k1×band_id+k2×(HSFN_id mod $M_{W\_RAR}$)+k3×$M_{W\_RAR}$×floor(SFN_id/minPeriod), wherein, n0 is a coefficient, floor( ) indicates rounding downward; the value of ki is the maximum value after summing one or more factors preceding it, i=1, 2, 3; for example, k1 could be 1, and k2 could be the maximum number of bands within the system (e.g., 4), $M_{W\_RAR}$ is the largest length sustained by the RA response window length (W_RAR), band_id is the band index of the preamble transmission, SFN_id is the radio frame sequence number of the preamble transmission, HSFN_id is the superframe sequence number of the preamble transmission, minPeriod is the smallest period of random access.

Within the preferred embodiment, the value of n0 is 1. Within the preferred embodiment, $M_{W\_RAR}$ can be determined according to the downlink control channel transmission period (PDCCH period); $M_{W\_RAR}$ is the maximum number of superframes corresponding to the PDCCH period×k; or, $M_{W\_RAR}$ is the maximum number of superframes corresponding to the RAR detection window; wherein, k is a coefficient.

Within the preferred embodiment, at least one of the following: the RA-RNTI calculation formula, or the minPeriod value, can be determined by at least one of the following: the number of effective subframes sustained by the downlink control channel search space (Rmax), the downlink control channel transmission period, or the RAR window length.

Within the preferred embodiment, determining the minPeriod value based on at least one of the following: Rmax, the downlink control channel transmission period, or the RAR window length can comprise: determining the minPeriod as the smallest PRACH period; for example, 4 radio subframes; or, determining the minPeriod according to the Rmax value; for example, when the Rmax is greater than x1, the minPeriod is 16, 32, 64, 128, 256, 512; when the Rmax is lesser than or equal to x1, the minPeriod is 4; or, determining the minPeriod according to the downlink control channel transmission period value; for example: when downlink control channel transmission period is greater than x2, the minPeriod is 32, 64, 128, 256, 512; when the downlink control channel transmission period is lesser than or equal to x2, the minPeriod is 4; or, determining the minPeriod value according to the RAR window length; for example: the RAR window length is greater than x2, and the minPeriod is 32, 64, 128, 256, 512; the RAR window length is lesser than or equal to x3, and the minPeriod is 4.

Within the preferred embodiment, x1 can be 128, x2 can be 512, and x3 can be 512 radio frames.

Within the preferred embodiment, determining the RA-RNTI calculation formula according to at least one of the following: Rmax, the downlink control channel transmission period, or the RAR window length, can comprise: determining the RA-RNTI calculation formula according to the Rmax; for example, when the Rmax is greater than x1, the RA-RNTI is determined based on superframes, frames, and band_id; when the Rmax is lesser than or equal to x1, the RA-RNTI is determined based on frames and band_id; alternatively, determining the RA-RNTI calculation formula according to the downlink control channel transmission period; for example, when the downlink control channel transmission period is greater than x2, the RA-RNTI is determined based on superframes, frames, and band_id; when the downlink control channel transmission period is lesser than or equal to x2, the RA-RNT is determined based on frames and band_id; alternatively, determining the RA-RNTI calculation formula according to the RAR window length; for example, the RAR window length is greater than x3, and the RA-RNTI is determined based on superframes, frames, and band_id; the RAR window length is lesser than or equal to x2, and the RAR-RNTI is determined based on frames and band_id.

Within the preferred embodiment, x1 can be 128, x2 can be 512, and x3 can be 512 radio frames.

Additionally, the embodiments of the present invention also provide a computer-readable storage medium, storing computer-executable instructions; the computer-executable instructions, when executed by a processor, can implement the random access methods described above.

It will be apparent to those of ordinary skill in the related art that the modules/units in all of or some of the steps, systems, and apparatus of the methods disclosed herein can be implemented as software, firmware, or appropriate combinations thereof. With hardware implementation, the division of the functional modules/units described herein does not necessarily correspond to the division of the physical units; for example, a physical component can have multiple functions, or a function or step can be executed by the cooperation of several physical components. A few components or all of the components can be implemented by a processor, such as by the software of a digital signal processor or a microprocessor, or can be implemented as an integrated circuit, such as a specialized integrated circuit. This software can be distributed on a computer-readable medium; the computer-readable medium can comprise a computer storage medium (or non-temporary medium) and a communication medium (or temporary medium). As is apparent to those of ordinary skill in the related art, the term computer storage medium comprises the volatile, nonvolatile, removable, and non-removable mediums used in any of the methods or skills to store information (e.g., computer-readable instructions, data structures, program modules, or other data). Computer storage mediums comprise, but are not limited to, RAM, ROM, EEPROM, flash memory or other memory technology, CD-ROM, digital versatile disk (DVD) or other CD storage, magnetic cassettes, magnetic tapes, magnetic disks or other magnetic storage devices, or any other medium that may be used to store information and which can be accessed by a computer.

Additionally, it will be apparent to those of ordinary skill in the related art that communication mediums typically contain computer-readable instructions, data structures, program modules or, for example, other data within modulation data signals of carriers or other transmission mechanisms of this type, and can comprise any information delivery medium.

The principles, main features, and advantages of the present application have been demonstrated and described above. The present application is not limited by the embodiments outlined above; the embodiments and explanations of the present disclosure only serve to explain the principles of the present application. Without straying from its spirit and scope, the present application will undergo various changes and improvements; these changes and improvements should all fall under the scope of the present claims.

INDUSTRIAL APPLICABILITY

The embodiments of the present application provide a method and apparatus for random access, and use the RA-RNTI formula to introduce factors able to reflect the difference of the initial radio frames of the preamble transmission, or to reflect the frequency domain position index information, and thus ensure that RA response window overlap will not produce additional interference, as well as reduce terminal power consumption.

What is claimed is:

1. A method for random access, comprising:
a communication node obtaining random access information correlation factors;
the communication node determining the random access radio network temporary identity (RA-RNTI) according to the random access information correlation factors, wherein
the communication node determining the RA-RNTI according to the random access information correlation factors comprises:
the communication node determining the RA-RNTI as:

$$RA\text{-}RNTI = n0 + \sum_{i=1}^{N} K_i \times c_i;$$

wherein, n0 is a coefficient, N is the number of random access information correlation factors, $$K_i = n0 + \sum_{i=1}^{N} (K_{i-1} \times \text{MAX}(c_{i-1})),$$

and MAX ($c_{i-1}$) indicates the largest value of $c_{i-1}$.

2. The method for random access of claim 1, wherein, n0=1.

3. The method for random access of claim 1, wherein, the random access information correlation factors comprise the following or a combination thereof:
the sequence number of the initial subframe of the preamble transmission;
the sequence number of the initial radio frame of the preamble transmission;
the number of physical random access channel resources configured within each radio frame;
preamble repeat factors;
the sequence number of the final subframe of the preamble transmission;

the sequence number of the final radio frame of the preamble transmission;
the frequency domain position offset of the preamble transmission;
the frequency domain subcarrier index; and
the random access (RA) response window length.

4. The method for random access of claim 1, wherein after the communication node determines the RA-RNTI according to the random access information correlation factors, the method for random access further comprises: when the RA-RNTI is determined to exceed the maximum value within the predetermined value range, the communication node determines the RA-RNTI to be a predetermined value.

5. The method for random access of claim 1, wherein determining the RA-RNTI according to the random access information correlation factors comprises:
when one of the following types of random access information or a combination thereof corresponds to coverage rankings, the random access (RA) response window length, preamble repeat factors, the interval length of the preamble transmission, then the RA-RNTI calculation also corresponds to coverage rankings.

6. A method for random access, comprising:
a communication node obtaining random access information, wherein, the random access information comprises: the super frame sequence number of the preamble transmission; and
the communication node determining random access radio network temporary identity (RA-RNTI) according to the random access information, wherein
the communication node determining the RA-RNTI according to random access information comprises at least one of the following:
(1) the communication node determining the RA-RNTI as:

RA_RNTI=$n0+k1 \times$HSFN_id;

wherein, n0 and k1 are coefficients, and HSFN_id is the superframe sequence number of the preamble transmission;
(2) the communication node determining the RA-RNTI as:

RA_RNTI=$n0+k1 \times f($HSFN_id$)$;

wherein, n0 and k1 are coefficients, f( ) indicates a function that takes HSFN_id as its input, HSFN_id is the superframe sequence number of the preamble transmission; and
(3) the communication node determining the RA-RNTI as:

RA_RNTI=$n0+m \times f(ki, C_i)$;

wherein, f( ) indicates a function that takes ki, $C_i$ as its input; $C_i$ is random access information; n0, m, and ki are coefficients.

7. The method for random access of claim 6, wherein, the random access information comprises at least one of the following or a combination thereof:
the superframe sequence number of the preamble transmission (HSFN_id), or a function with it as its input;
the radio frame sequence number of the preamble transmission (SFN_id), or a function with it as its input;
the subframe sequence number of the preamble transmission (subSFN_id), or a function with it as its input;
the frequency domain position index of the preamble transmission (f_id), or a function with it as its input;
the frequency domain offset of the preamble transmission (f_offset), or a function with it as its input;
the subcarrier index of the preamble transmission (tone_id), or a function with it as its input;
the band index of the preamble transmission (band_id), or a function with it as its input; the transmission period of the downlink control channel (PDCCH period), or a function with it as its input;
the transmission period on the random access channel (PRACH period), or a function with it as its input;
the interval length of the preamble transmission (Preamble period), or a function with it as its input; the interval can be acquired through calculation or pre-configuration;
the RA response window length (W_RAR), or a function with it as its input;
the maximum length ($M_{W\_RAR}$) sustained by the RA response window length (W_RAR);
the number of radio frames contained within a superframe (HSFN number), or a function with it as its input;
the number of effective subframes sustained in the downlink control channel search space (RMax), or a function with it as its input; and
the number of repetitions on the downlink control channel (Ri), or a function with it as its input.

8. The method for random access of claim 6, wherein, the communication node determining the RA-RNTI according to random access information further comprises at least one of the following:
(4) the communication node determining the RA-RNTI as:

RA-RNTI=$n0+k1 \times$band_id$+k2 \times$floor(SFN_id/minPeriod)$+k2 \times$ceil(HSFNnumber/minPeriod)$\times$(HSFN_id mod $M_{W\_RAR}$);

wherein, n0 is a coefficient, minPeriod is the smallest period of random access, the unit for minPeriod is frames, $M_{W\_RAR}$ is the maximum length sustained by the RA response window length (W_RAR), the unit for $M_{W\_RAR}$ is superframes, ki is a positive integer, i=1, 2; floor( ) indicates rounding downward, ceil( ) indicates rounding upward; band_id is the band index of the preamble transmission, SFN_id is the radio frame sequence number of the preamble transmission, HSFNnumber is the number of radio frames contained within a superframe, HSFN_id is the superframe sequence number of the preamble transmission;
(5) the communication node determining the RA-RNTI as:

RA-RNTI=$n0+k1 \times$band_id$+k2 \times$floor(SFN_id/minPeriod)$+$floor($R$max/$z$)$\times [k2 \times$ceil(HSFNnumber/minPeriod)$\times$(HSFN_id mod $M_{W\_RAR}$)], wherein, n0 is a coefficient, minPeriod is the smallest period of random access, the unit for minPeriod is frames, $M_{W\_RAR}$ is the maximum length sustained by the RA response window length (W_RAR), the unit for $M_{W\_RAR}$ is superframes; z is the first threshold value, and the value range is positive integers; ki is a positive integer, i=1, 2; floor( ) indicates rounding downward, ceil( ) indicates rounding upward; band_id is the band index of the preamble transmission, SFN_id is the radio frame sequence number of the preamble transmission, HSFNnumber is the number of radio frames contained within a superframe, HSFN_id is the superframe sequence number of the preamble transmission, Rmax is the number of effective subframes in the downlink control channel search space;

(6) the communication node determining the RA-RNTI as:

RA-RNTI=$n0+k1 \times \text{band\_id}+k2 \times [\text{floor}(Rmax/z) \times (\text{HSFN\_id mod } M_{W\_RAR})]+k3 \times \text{floor}(\text{SFN\_id}/\text{minPeriod})$, wherein, n0 is a coefficient, z is the first threshold value, and the value range is positive integers; the value of ki is the maximum value after summing one or more factors preceding it, i=1, 2, 3; floor( ) indicates rounding downward; $M_{W\_RAR}$ is the maximum length sustained by the RA response window length (W_RAR), band_id is the band index of the preamble transmission, SFN_id is the radio frame sequence number of the preamble transmission, Rmax is the number of effective subframes in the downlink control channel search space, HSFN_id is the superframe sequence number of the preamble transmission, minPeriod is the smallest period of random access; and (7) the communication node determining the RA-RNTI as:

RA-RNTI=$n0+k1 \times \text{band\_id}+k2 \times (\text{HSFN\_id mod } M_{W\_RAR})+k3 \times M_{W\_RAR} \times \text{floor}(\text{SFN\_id/minPeriod})$, wherein, n0 is a coefficient, the value of ki is the maximum value after summing one or more factors preceding it, ki is a positive integer, i=1, 2, 3; floor( ) indicates rounding downward; $M_{W\_RAR}$ is the maximum length sustained by the RA response window length (W_RAR), band_id is the band index of the preamble transmission, SFN_id is the radio frame sequence number of the preamble transmission, HSFN_id is the superframe sequence number of the preamble transmission, minPeriod is the smallest period of random access.

9. The method for random access of claim 6, wherein, the value of n0 is 1.

10. The method for random access of claim 6, wherein, $M_{W\_RAR}$ is determined according to the downlink control channel transmission period (PDCCH period); $M_{W\_RAR}$ is the PDCCH period×the largest number of superframes corresponding to k; or, $M_{W\_RAR}$ is the largest number of superframes corresponding to the RAR detection window; wherein, k is a coefficient.

11. The method for random access of claim 6, wherein at least one of the following: the RA-RNTI calculation formula and the minPeriod value, can be determined by at least one of the following: the number of effective subframes sustained by the downlink control channel search space (Rmax), the downlink control channel transmission period, and the RAR window length.

12. The method for random access of claim 11, wherein, determining the minPeriod value based on at least one of the following: Rmax, the downlink control channel transmission period, or the RAR window length comprises:
determining the minPeriod as the smallest PRACH period;
determining the minPeriod according to the Rmax value;
determining the minPeriod according to the downlink control channel transmission period value; or,
determining the minPeriod value according to the RAR window length.

13. The method for random access of claim 11, wherein, determining the RA-RNTI calculation formula according to at least one of the following: Rmax, the downlink control channel transmission period, or the RAR window length comprises:
determining the RA-RNTI calculation formula according to the Rmax;
determining the RA-RNTI calculation formula according to the downlink control channel transmission period; or,
determining the RA-RNTI calculation formula according to the RAR window length.

14. The method for random access of claim 8, wherein, k1 is 1, and k2 is the maximum number of bands in the system.

15. The method for random access of claim 8, wherein, the value range for z comprises: 2048, 1024, 512, 256, 128, 64.

16. A communication node, comprising:
a receiver configured to receive random access information correlation factors;
at least one processor configured to:
determine the random access radio network temporary identity (RA-RNTI) according to the random access information correlation factors, wherein determining the RA-RNTI according to the random access information correlation factors comprises:
determining the RA-RNTI as:

$$RA\text{-}RNTI = n0 + \sum_{i=1}^{N} K_i \times c_i;$$

wherein, n0 is a coefficient, N is the number of random access information correlation factors, $$K_i = n0 + \sum_{i=1}^{N} (K_{i-1} \times \text{MAX}(c_{i-1})),$$

and MAX $(c_{i-1})$ indicates the largest value of $c_{i-1}$.

17. The communication node of claim 16, wherein, n0=1.

18. The communication node of claim 16, wherein, the random access information correlation factors comprise the following or a combination thereof:
the sequence number of the initial subframe of the preamble transmission;
the sequence number of the initial radio frame of the preamble transmission;
the number of physical random access channel resources configured within each radio frame;
preamble repeat factors;
the sequence number of the final subframe of the preamble transmission;
the sequence number of the final radio frame of the preamble transmission;
the frequency domain position offset of the preamble transmission;
the frequency domain subcarrier index; and
the random access (RA) response window length.

19. The communication node of claim 16, wherein after the at least one processor determines the RA-RNTI according to the random access information correlation factors, the at least one processor is further configured to, when the RA-RNTI is determined to exceed the maximum value within the predetermined value range, determine the RA-RNTI to be a predetermined value.

20. The communication node of claim 16, wherein determining the RA-RNTI according to the random access information correlation factors comprises:
when one of the following types of random access information or a combination thereof corresponds to coverage rankings, the random access (RA) response window length, preamble repeat factors, the interval length of the preamble transmission, then the RA-RNTI calculation also corresponds to coverage rankings.

* * * * *